United States Patent Office 3,065,382
Patented Nov. 20, 1962

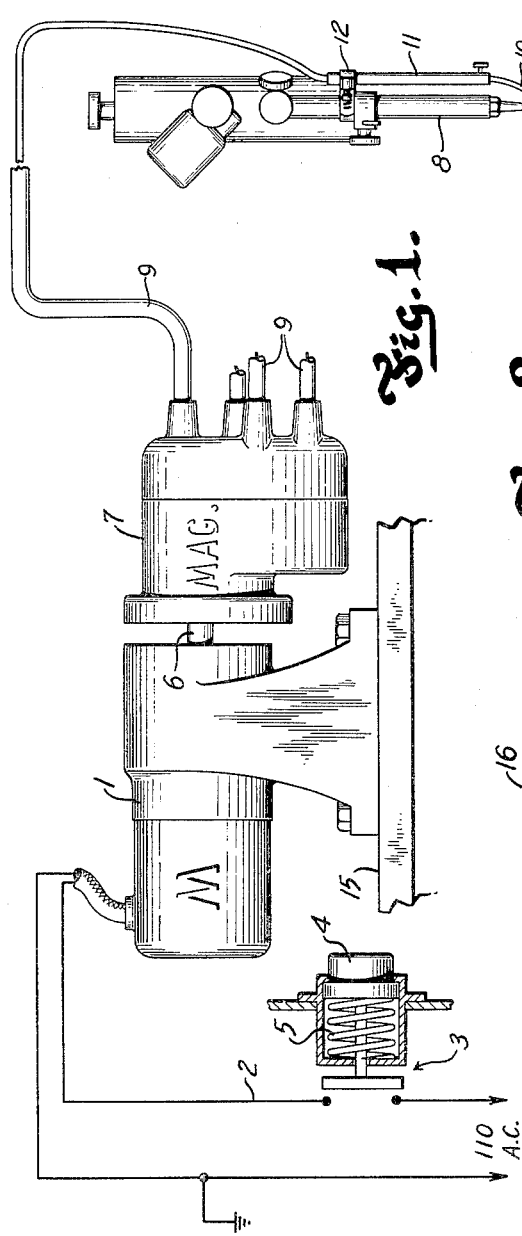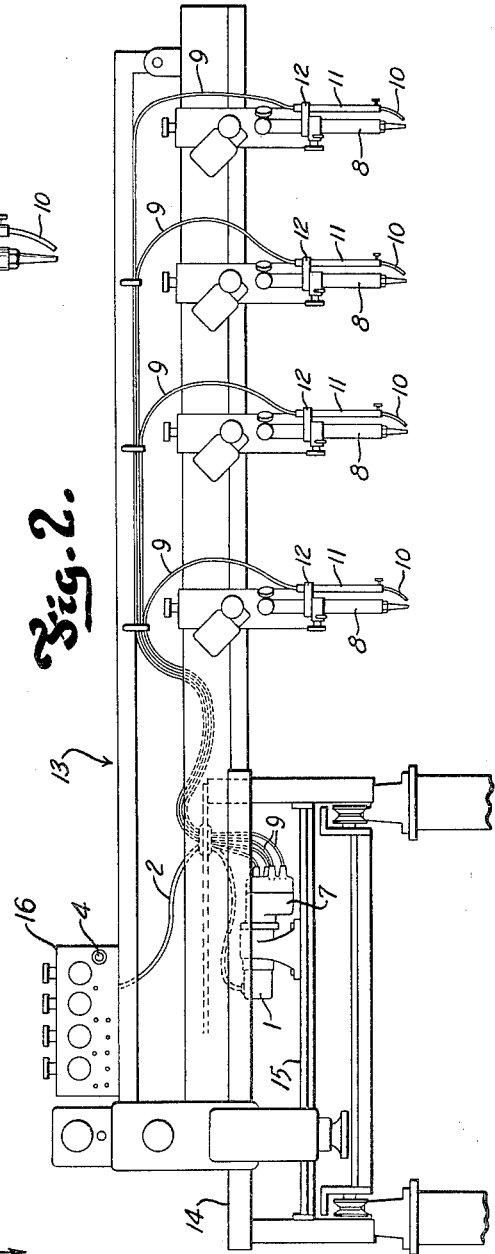

3,065,382
AUTOMATIC FLAME IGNITER
Rudolph W. Kleine, Milwaukee, Wis., assignor to C.R.O. Engineering Co., Inc., Milwaukee, Wis., a corporation of Wisconsin
Filed Oct. 18, 1960, Ser. No. 63,335
3 Claims. (Cl. 317—83)

This invention relates to an automatic flame igniter, and more particularly to a mechanism for igniting a plurality of torches in sequence.

The device has particular application in a flame cutting machine, wherein a number of flame torches are utilized to produce the completed workpiece.

Heretofore, electrical igniters have been produced for flame cutting machines which supply a voltage impulse to a spark gap between an electrode and the torch tip. To the knowledge of the inventor, this was always accomplished in a flame cutting machine by means of a high voltage transformer connected between a switch on the line side and the electrode at the gap. When the switch was closed, a voltage build-up between the electrode and torch tip created a spark to ignite the gas coming through the tip.

In cases where a multiplicity of torches had to be ignited in a flame cutting machine, a separate transformer was necessary for each torch, thus adding to the expense and bulk of the machine. Furthermore, it has been found that the low voltage output of the transformers was occasionally insufficient to ignite the torch upon first try. That is, while some of the torches lit, others did not, thus requiring repetition of the igniting step.

The present invention solves the aforementioned problems and eliminates the need for any transformers, coils or distributors in the system. In addition, the invention increases the voltage to a point where positive firing of all torches in a multiple torch system is assured.

In accordance with the invention, a magneto of any well-known design is driven for a very short period and at high speed by an electric motor directly coupled thereto. The various outputs of the magneto are connected directly to an electrode at the torch tip.

The accompanying drawings illustrate the best mode presently contemplated by the inventor for carrying out the invention.

In the drawings:

FIGURE 1 is a diagrammatic representation of an igniting device constructed in accordance with the invention; and FIG. 2 is a diagrammatic side elevation of a flame cutting machine incorporating the invention.

As shown in FIGURE 1 of the drawings, the spark generator comprises a small electric motor 1 which is capable of rotational output speeds of approximately 2500 r.p.m. or more. Motor 1 is connected to a suitable source of electrical energy, such as a 110 volt, 60 cycle line 2, and is adapted for manual control. For this purpose, a suitable switch 3 is inserted in line 2. The switch is shown as having a manually engageable button 4 which is biased outwardly toward switch disengaging position by a spring 5.

The output shaft 6 of motor 1 is connected directly to the rotary input of a magneto 7. Magneto 7 is of any type well known in the art which is capable of producing voltage impulses of the order of 25,000 volts when driven at high speeds, i.e., approximately 2500 r.p.m.

Magneto 7 is provided with a plurality of outputs corresponding in number to the number of flame cutting torches 8 which are to be ignited. As shown, an electrode wire 9 directly connects each magneto output with a firing electrode 10 for each torch. Each electrode 10 is shown as disposed in a suitable shield or holder 11 which is in turn secured to the torch by a clamp 12.

The outer end portion of each electrode 10 is bent toward the tip of its respective torch and should be spaced therefrom a distance of from 1/4" to 1/2". However, in the present instance which involves the high voltage of the order referred to, the electrode will function even if the end is bumped or moved to as far as 3/4" from the torch tip. Previous systems required a spark gap of 1/4" or less, and the setting was therefore extremely critical.

FIGURE 2 shows the invention mounted on a suitable flame cutting machine 13 having the usual supporting frame 14 and a carriage shelf 15. Motor 1 and magneto 7 are mounted on shelf 15, and wires 9 extend therefrom to the torch and electrode units spaced along the frame.

At the beginning of machine operation, cutting gas is supplied from a suitable source, not shown, to all of the tips of torches 8. Button 4 is then pushed momentarily, and motor 1 immediately brings magneto 7 up to speed. Sparks then pass across the respective gaps in sequence to ignite the gas, and button 4 is then released. It has been found that the operator need only close switch 3 for a fraction of a second to produce complete ignition of all the torches.

If desired, switch 3 may be disposed in a suitable control box 16 secured to the machine frame. In addition, manual actuation of switch 3 may be replaced by automatic control. For example, in a machine with an automatic cycle, pushing of the "start" button can actuate a time-delay relay which actuates switch 3 at the proper time for the short period desired.

The invention provides a much simplified apparatus for igniting torches which entirely eliminates the need for expensive and bulky transformers and other related equipment. The magneto generates its own electromotive force which is dependent only on mechanical input. At the same time, a much increased voltage is provided to assure complete firing of all torches every time. Accidental movement of the electrode adjacent the torch tip will not destroy the igniting function.

Various modes of carrying out the invention are contemplated as being within the scope of the following claims particularly pointing out and distinctly claiming the subject matter which is regarded as the invention.

I claim:

1. In a flame cutting machine having a plurality of gas torches, a flame igniter comprising:
   a magneto capable of producing high voltage impulses in sequence at a plurality of separate outputs,
   a motor having a high speed drive member directly connected to said magneto to actuate the latter so that said high voltage impulses are produced at said outputs,
   an electrode connected to each output of said magneto and secured closely adjacent the tip of a respective gas torch, and
   means to energize said motor momentarily,
   whereby all of said electrodes will be supplied in sequence with said voltage impulses so that sparks will pass between each electrode and its respective torch tip to positively ignite all of the torches in less than one second.

2. The apparatus of claim 1 in which:
   the said motor is capable of driving said drive member at high rotational speeds on the order of 2500 r.p.m., and
   the said magneto produces high voltage impulses on the order of 25,000 volts at said electrodes when said drive member is rotating at said high rotational speeds.

3. The apparatus of claim 2 in which:
each electrode is spaced from its respective torch tip within a range from one to three times the minimum permissible spacing.

References Cited in the file of this patent

UNITED STATES PATENTS

| | | |
|---|---|---|
| 1,114,096 | Beeneck | Oct. 20, 1914 |
| 1,139,759 | Fox | May 18, 1915 |
| 1,421,286 | Milton | June 27, 1922 |
| 1,950,987 | Kongsted | Mar. 13, 1934 |
| 2,238,890 | Clark | Apr. 22, 1941 |
| 2,377,793 | Linlor | June 5, 1945 |
| 2,896,704 | Aleweld | July 28, 1959 |